US012606417B2

(12) United States Patent
Cianciolo

(10) Patent No.: US 12,606,417 B2
(45) Date of Patent: Apr. 21, 2026

(54) SYSTEMS AND METHODS FOR PROTECTING ROBOT TAILGATING IN BUILDING ENVIRONMENTS

(71) Applicant: Tyco Fire & Security GmbH, Neuhausen am Rheinfall (CH)

(72) Inventor: Christopher Cianciolo, Milwaukee, WI (US)

(73) Assignee: Tyco Fire & Security GmbH, Neuhausen am Rheinfall (CH)

(*) Notice: Subject to any disclaimer, the term of this patent is extended or adjusted under 35 U.S.C. 154(b) by 1234 days.

(21) Appl. No.: 17/489,127

(22) Filed: Sep. 29, 2021

(65) Prior Publication Data

US 2023/0094967 A1 Mar. 30, 2023

(51) Int. Cl.
*B66B 13/14* (2006.01)
*G07C 9/28* (2020.01)

(52) U.S. Cl.
CPC .............. *B66B 13/146* (2013.01); *G07C 9/28* (2020.01)

(58) Field of Classification Search
CPC ................ B66B 13/146; B66B 5/0012; B66B 2201/4676
See application file for complete search history.

(56) References Cited

U.S. PATENT DOCUMENTS 6,507,278 B1 1/2003 Brunetti et al.
6,707,374 B1 * 3/2004 Zaharia ................... B66B 1/468 340/5.31
8,857,569 B2 * 10/2014 Friedli .................. B66B 5/0012 187/392
10,852,751 B2 12/2020 Scanu et al.
2008/0068162 A1 3/2008 Sharma et al.
2012/0031709 A1 2/2012 Finschi
2012/0037458 A1 2/2012 Gerstenkorn
2012/0160613 A1 6/2012 Friedli
(Continued)

FOREIGN PATENT DOCUMENTS

CN 107209964 B 5/2021
CN 114506750 A 5/2022
(Continued)

OTHER PUBLICATIONS

International Search Report in PCT/US2022/077184, mailed Apr. 12, 2023, 3 pages.
(Continued)

*Primary Examiner* — Rina I Duda
(74) *Attorney, Agent, or Firm* — ArentFox Schiff LLP

(57) ABSTRACT

Systems and methods for protecting autonomous mobile machine tailgating may include an elevator control system that receives, from an autonomous mobile machine, an request signal requesting access by the autonomous mobile machine to a restricted floor of a facility. The elevator control system may also determine a presence of an individual in an elevator with the autonomous mobile machine. The elevator control system may perform a tailgate prevention operation to prevent an unauthorized access of the individual to the restricted floor by following the autonomous mobile machine. The elevator control system may also provide access for the autonomous mobile machine to exit the elevator at the restricted floor, in response to the tailgate prevention operation being performed.

18 Claims, 5 Drawing Sheets

(56) References Cited

U.S. PATENT DOCUMENTS

| | | | |
|---|---|---|---|
| 2018/0018823 | A1 | 1/2018 | Cianciolo et al. |
| 2018/0322268 | A1* | 11/2018 | Grammer ................. G07C 9/27 |
| 2019/0005788 | A1 | 1/2019 | Siu et al. |
| 2019/0010750 | A1 | 1/2019 | Scanu et al. |
| 2019/0080535 | A1 | 3/2019 | Berg et al. |
| 2019/0102903 | A1 | 4/2019 | Siu et al. |
| 2019/0172284 | A1* | 6/2019 | Herget ..................... B25J 5/007 |
| 2019/0244459 | A1 | 8/2019 | Horgan et al. |
| 2019/0354220 | A1 | 11/2019 | Ribbich et al. |
| 2019/0355193 | A1 | 11/2019 | Kirsch et al. |
| 2020/0061839 | A1* | 2/2020 | Deyle .................. G06Q 10/087 |
| 2020/0262679 | A1 | 8/2020 | Simcik et al. |
| 2020/0363817 | A1 | 11/2020 | Takai et al. |
| 2021/0046650 | A1 | 2/2021 | Deyle et al. |
| 2021/0048829 | A1 | 2/2021 | Deyle et al. |
| 2021/0327189 | A1 | 10/2021 | Jarvis et al. |
| 2022/0194737 | A1 | 6/2022 | Oda et al. |
| 2022/0299953 | A1 | 9/2022 | Patil et al. |
| 2023/0161861 | A1 | 5/2023 | Gou |
| 2024/0242555 | A1 | 7/2024 | Jarvis et al. |
| 2025/0002294 | A1 | 1/2025 | Ouellette et al. |

FOREIGN PATENT DOCUMENTS

| | | | |
|---|---|---|---|
| CN | 115893129 | A | 4/2023 |
| CN | 119284672 | A | 1/2025 |
| CN | 119904802 | A | 4/2025 |
| EP | 4050579 | A1 | 8/2022 |
| JP | 2005-053670 | A | 3/2005 |
| JP | 2005-053671 | A | 3/2005 |
| JP | 2006-089262 | A | 4/2006 |
| JP | 2007-210801 | A | 8/2007 |
| WO | 02/29744 | A1 | 4/2002 |
| WO | 2020256195 | A1 | 12/2020 |
| WO | 2023/017421 | A1 | 2/2023 |
| WO | 2023/056298 | A2 | 4/2023 |

OTHER PUBLICATIONS

Written Opinion in PCT/US2022/077184, mailed Apr. 12, 2023, 9 pages.

* cited by examiner

SYSTEMS AND METHODS FOR PROTECTING ROBOT TAILGATING IN BUILDING ENVIRONMENTS

TECHNICAL FIELD

The present disclosure relates generally to security systems, and more particularly, to a system and methods for protecting robot tailgating in building environments.

BACKGROUND

Facilities may use autonomous mobile machines, such as, but not limited to, wheeled robots, legged robots, or drones, for a number of functions including, but not limited to, security, surveillance, or cleaning of the facilities. Elevator control systems are often used at access points (such as, but not limited to, external and interior doors of a building) of facilities to control access to restricted areas of the facilities. The elevator control systems authenticate (or authorize) individuals and then permit the authenticated/authorized individuals to access the restricted areas through the access points. The autonomous mobile machines may also use the elevator control systems to access the restricted areas. However, use of the autonomous mobile machines may allow tailgating, i.e., individuals seeking access to restricted areas by following the autonomous mobile machines through a security measure such as an access gate.

In view of the foregoing, there is a need for improvements in elevator control systems for restricted areas.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In an aspect, an elevator control system including a memory storing instructions and one or more processors coupled with the memory, is provided. The elevator control system may be configured to receive, from an autonomous mobile machine, a restricted floor request signal requesting access by the autonomous mobile machine to a restricted floor of a facility. The elevator control system may be configured to determine a presence of an individual in an elevator with the autonomous mobile machine, in response to the restricted floor request signal being received. The elevator control system may be configured to perform a tailgate prevention operation to prevent an unauthorized access of the individual to the restricted floor by following the autonomous mobile machine, in response to the presence of the individual being determined. The elevator control system may be configured to provide access for the autonomous mobile machine to exit the elevator at the restricted floor, in response to the tailgate prevention operation being performed.

In another aspect, a method for an elevator control system to protect autonomous mobile machine tailgating, is provided. The method may include receiving, from an autonomous mobile machine, a restricted floor request signal requesting access by the autonomous mobile machine to a restricted floor of a facility. The method may include determining a presence of an individual in an elevator with the autonomous mobile machine, in response to the restricted floor request signal being received. The method may include performing a tailgate prevention operation to prevent an unauthorized access of the individual to the restricted floor by following the autonomous mobile machine, in response to the presence of the individual being determined. The method may include providing access for the autonomous mobile machine to exit the elevator at the restricted floor, in response to the tailgate prevention operation being performed.

In another aspect, a computer-readable medium storing computer-executable code for an elevator control system to protect autonomous mobile machine tailgating, is provided. The computer-readable medium comprising code to receive, from an autonomous mobile machine, a restricted floor request signal requesting access by the autonomous mobile machine to a restricted floor of a facility. The computer-readable medium comprising code to determine a presence of an individual in an elevator with the autonomous mobile machine, in response to the restricted floor request signal being received. The computer-readable medium comprising code to perform a tailgate prevention operation to prevent an unauthorized access of the individual to the restricted floor by following the autonomous mobile machine, in response to the presence of the individual being determined. The computer-readable medium comprising code to provide access for the autonomous mobile machine to exit the elevator at the restricted floor, in response to the tailgate prevention operation being performed.

Further aspects of the present disclosure are described in more details below.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Elevator control systems are often used at public and private facilities, such as households, commercial buildings, businesses, retail establishments, schools, hospitals and government buildings, to list a few examples. Elevator control system nodes (e.g., card reader) may be installed at access points of the facilities (such as, but not limited to, external and interior doors of buildings as well as elevator doors) to control access to restricted areas, such as the facilities themselves or to areas within the facilities. The elevator control systems authenticate (or authorize) individuals and then permit the authenticated/authorized individuals to access the restricted areas through the access points.

Autonomous mobile machines, such as robots or drones, may be used by facilities for one or more functions including, but not limited to, security, surveillance, or cleaning of the facilities. The autonomous mobile machines may require access to the restricted areas in order to perform one or more of these functions and thereby may require access via the elevator control systems. In some situations, unauthorized individuals may attempt to tailgate, or follow, authorized autonomous mobile machines into the restricted areas thereby improperly gaining access to the restricted area.

Aspects of the present disclosure include systems and methods for protecting against autonomous mobile machine tailgating on an elevator. In an example, an elevator control system is configured to receive, from an autonomous mobile machine, an access request signal requesting access by the autonomous mobile machine to a restricted floor of a facility. The elevator control system may also be configured to receive a presence signal indicating a presence of an individual in the elevator. In response to the presence signal, the elevator control system may also be configured to perform a tailgate prevention operation to prevent unauthorized access of an individual by tailgating the autonomous mobile machine onto the restricted floor.

Turning now to the figures, example aspects are depicted with reference to one or more components described herein, where components in dashed lines may be optional.

Figure 1:
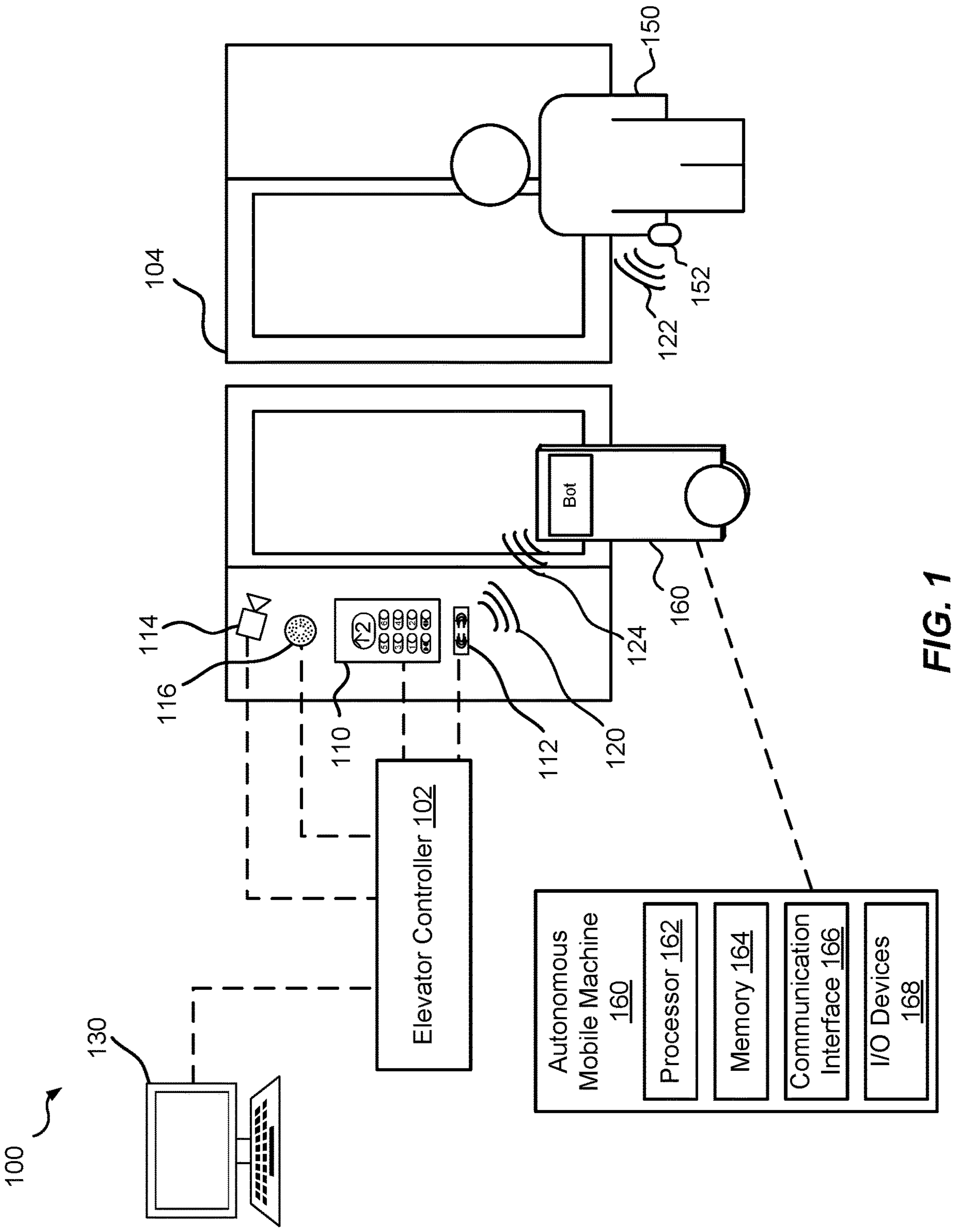
FIG. 1 is a conceptual diagram of an example elevator control system, according to aspects of the present disclosure.

Referring to FIG. 1, an example elevator control system 100 deployed at a facility is depicted. The elevator control system 100 may include an elevator controller 102 configured to communicate with and/or directly or indirectly control an opening and closing mechanism of an elevator door 104 for individuals to enter/exit an elevator at different floors, including restricted floors, of the facility. In an example, the elevator controller 102 may be located at the facility or at a location remote to the facility.

In an example, the elevator control system 100 may include one or more elevator control panels 110 including, for example, one or more input controls (e.g., buttons) for indicating a desired floor for an individual 150 and/or an autonomous (e.g., fully autonomous or semi-autonomous) mobile machine 160 to enter or exit the elevator. The elevator control panel 110 may be positioned within the elevator and/or near an outside of the elevator door 104.

The elevator control system 100 may also include one or more access control nodes 112 (e.g., access card reader or fob reader) configured to communicate with the elevator controller 102. The access control node 112 may be positioned within the elevator and/or near the outside the elevator door 104. In an aspect, the access control node 112 may communicate with an access key 152 (e.g., access card) to gather access information, and provide the access information to the elevator controller 102. In an example, the access control node 112 may transmit an interrogation signal 120 (e.g., at frequencies specific to the type of access key 152 being used in the elevator control system 100 such as, for example, radio frequency identification (RFID) or near field communication (NFC)) to interrogate the access key 152 and, if present, receive a data signal 122 (e.g., electromagnetic fields) containing information (e.g., authentication information of individual 150) corresponding to the individual 150 associated with access key 152.

In an aspect, the elevator control system 100 may also include one or more input/output devices positioned within the elevator or outside the elevator. The input/output devices may include, but are not limited to one or more sensors 114 (e.g., camera, motion sensor, microphone, or heat sensor) for capturing information on a presence of the individual 150 and/or the autonomous mobile machine 160 (e.g., bot) within the elevator or outside the elevator. The input/output devices may also include a speaker 116 for communicating with the individual 150 in the area near the elevator door 104.

In another aspect, the elevator control system 100 may also include a monitoring station 130 configured to communicate, via the elevator controller 102 with, for example, any of the elevator control panel 110, the access control node 112, the one or more sensors 114, the speaker 116, the autonomous mobile machine 160, or the access key 152. The monitoring station 130 may be located at the facility or at a location remote to the facility.

In an aspect, the elevator control system 100 may communicate with the autonomous mobile machine 160 configured to maneuver about the facility for surveillance, security, and/or cleaning purposes. An example of the autonomous mobile machine 160 may include a wheeled robot, a legged robot, flying robot (e.g., drone), or any type of autonomous mobile machine configured to autonomously move about a facility. The autonomous mobile machine 160 may include a processor 162 coupled with a memory 164. The processor 162 may be configured to control functions of the autonomous mobile machine 160 including communications with the elevator controller 102 via a communication interface 166 and capturing and outputting information via input/output (I/O) devices 168 (e.g., microphone, speaker, imaging sensor, motion sensor, heat sensor).

In an aspect, the autonomous mobile machine 160 may communicate (via, for example, processor 162 and communication interface 166) with the elevator controller 102 by transmitting a data signal 124 to the elevator control panel 110 (via the access control node 112) to indicate a presence of the autonomous mobile machine 160 near the elevator door 104 and/or a floor the autonomous mobile machine 160 would like to enter/exit. In an example, the data signal 124 may include authentication information corresponding to the autonomous mobile machine 160. In an example, the access control node 112 may transmit the interrogation signal 120 (e.g., at frequencies specific to the type of autonomous mobile machine 160 being used in the elevator control system 100 such as, for example, RFID or NFC communications) to interrogate for the autonomous mobile machine 160 in an area near the elevator door 104 or the inside of the elevator. If the autonomous mobile machine 160 is present, the elevator controller 102 may receive the data signal 124, in response to the interrogation signal 120.

In an aspect, the autonomous mobile machine 160 may also transmit to the elevator controller 102 information obtained from the I/O devices 168 via the data signal 124. For example, the autonomous mobile machine 160 may provide audio/video data or motion sensor data captured by the I/O devices 168 to indicate to the elevator controller 102 the presence of the individual 150 near the autonomous mobile machine 160 and/or to allow the elevator controller 102 to monitor the presence of the individual 150.

Figure 2:
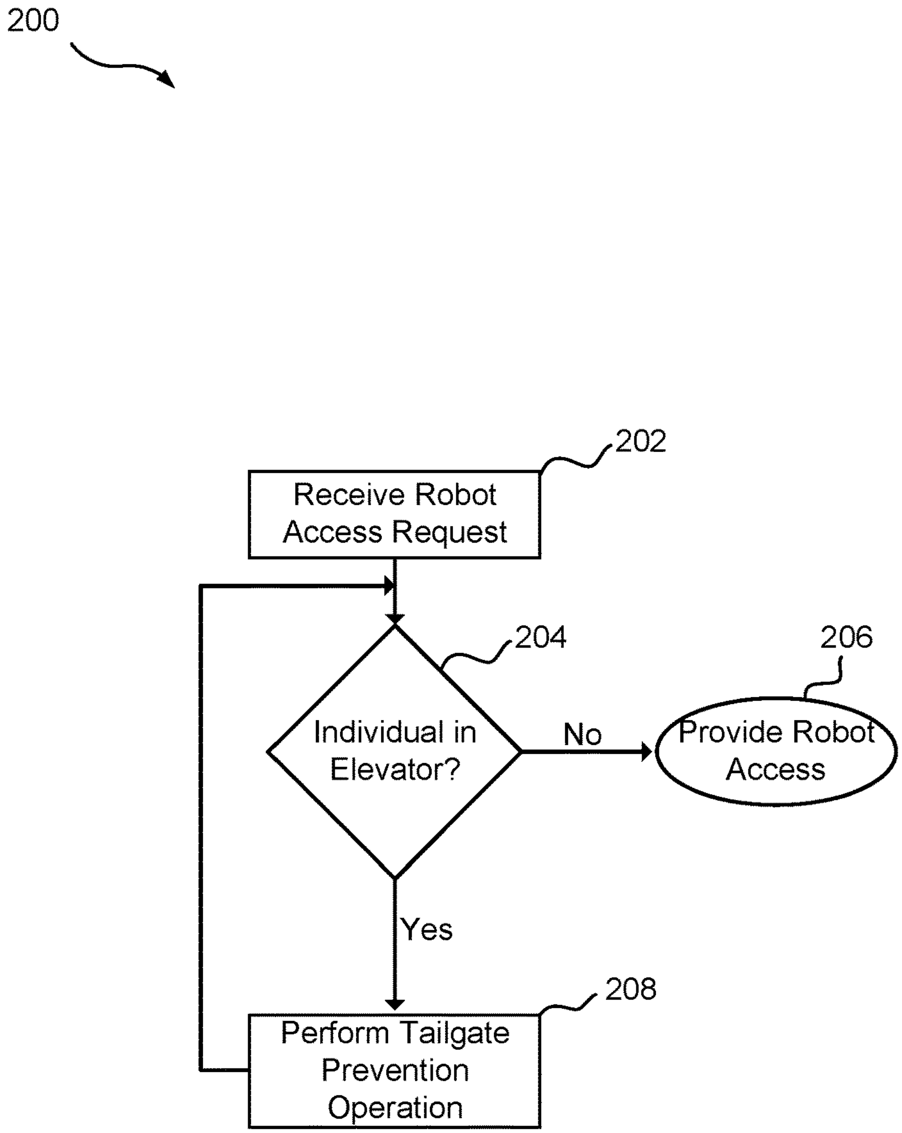
FIG. 2 is a flowchart of an example method implemented by the elevator control system of FIG. 1, according to aspects of the present disclosure.

Referring to FIG. 2, an example method 200 used by the elevator controller 102 for preventing tailgating is described. At block 202, the elevator controller 102 may receive a restricted floor request signal from the autonomous mobile machine 160 via the data signal 124 indicating a restricted floor that the autonomous mobile machine 160 wants access to via the elevator. The autonomous mobile machine 160 may provide the data signal 124 when the autonomous mobile machine 160 is outside the elevator (e.g., waiting to enter the elevator) or inside the elevator.

In an example, the access control node 112 may use, for example, an RFID system and may send the interrogation signal 120 periodically (e.g., every second). When the autonomous mobile machine 160 is within a receiving distance of the interrogation signal 120 (e.g., near access control node 112), the access control node 112 may receive the data signal 124 in response to the interrogation signal 120. In another example, the access control node 112 may use, for example, an NFC system and may listen for the data signal 124, without sending the interrogation signal 120.

The data signal 124 may include authentication information corresponding to the autonomous mobile machine 160 to the elevator controller 102 and may also include an indication of the restricted floor that the autonomous mobile machine 160 wants access to via the elevator.

In an example, the elevator controller 102 may verify the authentication information from the autonomous mobile machine 160, to verify that the autonomous mobile machine 160 is authorized to access the restricted floor.

If the autonomous mobile machine 160 is outside the elevator and once the authentication information is verified, the elevator controller 102 may control the elevator and the elevator door 104 to allow access for the autonomous mobile machine 160 to enter the elevator before moving to the next block of the method 200. If the autonomous mobile machine 160 is inside the elevator and the authentication information is verified, the elevator controller 102 may move to the next block of the method 200

At block 204, the elevator controller 102 may determine a presence of the individual 150 within the elevator with the autonomous mobile machine 160. In an example, determination of the presence of the individual 150 may be based on information captured by the one or more sensors 114 and/or the I/O devices 168 of the autonomous mobile machine 160. For example, the elevator controller 102 may instruct the autonomous mobile machine 160 to detect whether the individual 150 is present in the elevator based on the one or more sensors 114. In another example, the elevator controller 102 may request data from the one or more sensors 114 and/or the I/O devices 168 of the autonomous mobile machine 160, and may determine whether the individual 150 is present based on the received data. The autonomous mobile machine 160 may transmit and the elevator controller 102 may receive a presence signal indicating that the individual is present in the elevator, or an absence signal indicating that the individual is not present in the elevator.

If the individual 150 is not present in the elevator, at block 206, the elevator controller 102 controls the elevator and the elevator door 104 to provide access for the autonomous mobile machine 160 to exit at the restricted floor indicated by the autonomous mobile machine 160.

Alternatively, if the individual 150 is present in the elevator, at block 208, the elevator controller 102 performs a tailgate prevention operation to prevent the individual from tailgating the autonomous mobile machine 160 into the restricted area.

In a first tailgate prevention operation example, if the elevator controller 102 has received an indication that the individual 150 wants to exit at a floor (e.g., ninth floor) different from the restricted floor (e.g., third floor) indicated by the autonomous mobile machine 160, the elevator controller 102 may control the elevator and the elevator door 104 to allow the individual 150 to exit at the individual's desired floor prior to providing access for the autonomous mobile machine 160 to exit at the restricted floor. For example, if the elevator controller 102 receives an indication that the autonomous mobile machine 160 wants to exit at the third floor, being a restricted floor, of a facility, and the individual 150 wants to exit at the ninth floor of the facility, the elevator controller 102 may control the elevator and the elevator door 104 to allow the individual 150 to exit the elevator at the ninth floor before proceeding to the third floor, where the autonomous mobile machine 160 wants to exit. In this example, the autonomous mobile machine 160 may remain in the elevator until all unauthorized individuals (e.g., individual 150) have exited the elevator.

Further, after the elevator arrives at and opens the elevator doors 104 at the floor (e.g., ninth floor) designated by the individual 150, the elevator controller 102 may again determine whether the individual 150 is still present or not based on data from the autonomous mobile machine 160. If not present, the elevator controller 102 controls the elevator and the elevator doors 104 to allow the autonomous mobile machine 160 to exit at the restricted floor (e.g., third floor). If present, another tailgate prevention operation (e.g., repeat of the same operation or a different example operation, as disclosed herein), at block 208, may be performed.

In a second tailgate prevention operation example, the elevator controller 102 may attempt to obtain authentication information from the individual 150 to access the restricted floor. In this example, the elevator controller 102 may transmit the interrogation signal 120 to determine whether the access key 152 is detectable. If detected, and the individual 150 has access to the restricted area, the elevator controller 102 may provide access to the autonomous mobile machine 160 to exit the elevator at the restricted floor even if the individual is present. Otherwise, the elevator controller 102 may perform a different tailgate prevention operation.

In a third tailgate prevention operation example, the elevator controller 102 may communicate with the monitoring station 130 to determine whether an override of the tailgate prevention operation is okay. For example, the elevator controller 102 may transmit a notification (e.g., text, email, video, audio) of the presence of the individual 150 to the monitoring station 130. A user of the monitoring station 130 may authorize the autonomous mobile machine 160 to exit at the restricted floor even in the presence of the individual 150 (whether individual 150 is authorized or not to exit at the restricted floor). Therefore, in response to the notification, the elevator controller 102 may receive an override signal from the monitoring station 130 to allow the autonomous mobile machine 160 to exit at the restricted floor. Alternatively, the elevator controller 102 may receive a signal indicating that a different tailgate operation should be performed.

While examples herein describe a single individual, a person of ordinary skill in the art would understand how to expand the principles to the individual 150 to include a plurality of individuals.

Figure 3:
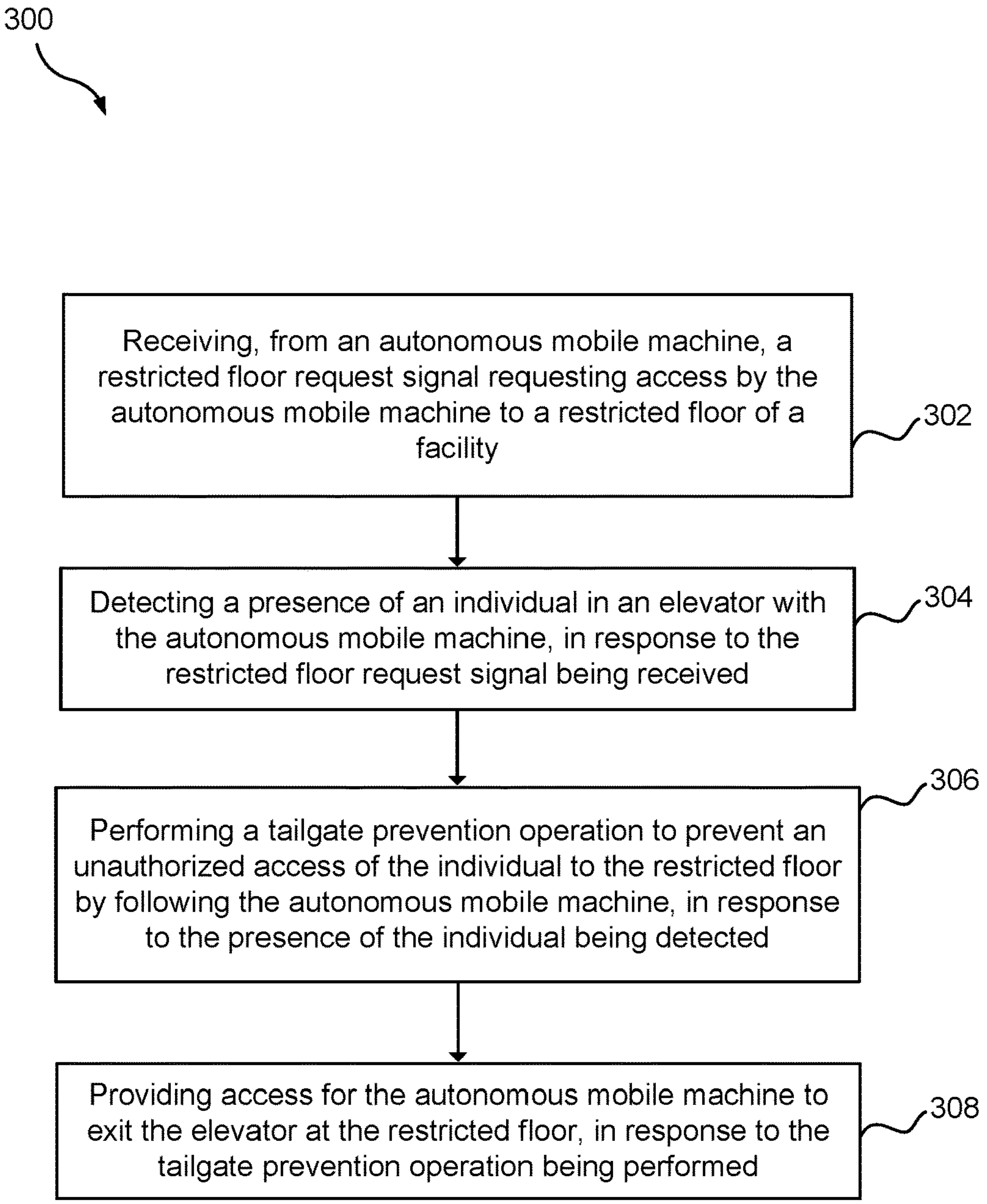
FIG. 3 is a flowchart of another example method implemented by the elevator control system of FIG. 1, according to aspects of the present disclosure.

Referring to FIG. 3, an example method 300 of controlling the elevator control system 100 is depicted. The operations of the method 300 may be performed by one or more components (e.g., elevator controller 102 of FIG. 1, and/or processor 404, memory 408, memory 410, or communications interface 424 of FIG. 4) of the elevator control system 100, as described herein.

At block 302, the method 300 may include receiving, from an autonomous mobile machine, a restricted floor request signal requesting access by the autonomous mobile machine to a restricted floor of a facility. For example, the elevator controller 102 of FIG. 1 along with the memory 408, the memory 410, and/or the communications interface 424 of FIG. 4 may receive, from the autonomous mobile machine 160, the data signal 124 including a restricted floor request signal requesting access by the autonomous mobile machine 160 to a restricted area (e.g., third floor) of a facility.

At block 304, the method 300 may include determining a presence of an individual in an elevator with the autonomous mobile machine, in response to the restricted floor request signal being received. For example, the elevator controller 102 of FIG. 1 along with the memory 408, the memory 410, and/or the communications interface 424 of FIG. 4 may receive a presence signal from the autonomous mobile machine 160, and based on data from the input sensors 114 and/or the I/O devices 168, determine the presence of the individual 150 in the elevator.

At block 306, the method 300 may include performing a tailgate prevention operation to prevent an unauthorized access of the individual to the restricted floor by following the autonomous mobile machine, in response to the presence of the individual being determined. For example, the elevator controller 102 of FIG. 1 along with the memory 408, the memory 410, and/or the communications interface 424 of FIG. 4 may perform one or more of the tailgate prevention operations, described herein, to prevent an unauthorized access of the individual 150 to the restricted floor (e.g., third floor).

At block 308, the method 300 may include providing access for the autonomous mobile machine to exit the elevator at the restricted floor, in response to the tailgate prevention operation being performed. For example, the elevator controller 102 of FIG. 1 along with the memory 408, the memory 410, and/or the communications interface 424 of FIG. 4 may provide access for the autonomous mobile machine 160 to exit the elevator at the restricted floor (e.g. control elevator and elevator door 104 to provide access), in response to the tailgate prevention operation being performed.

Figure 4:
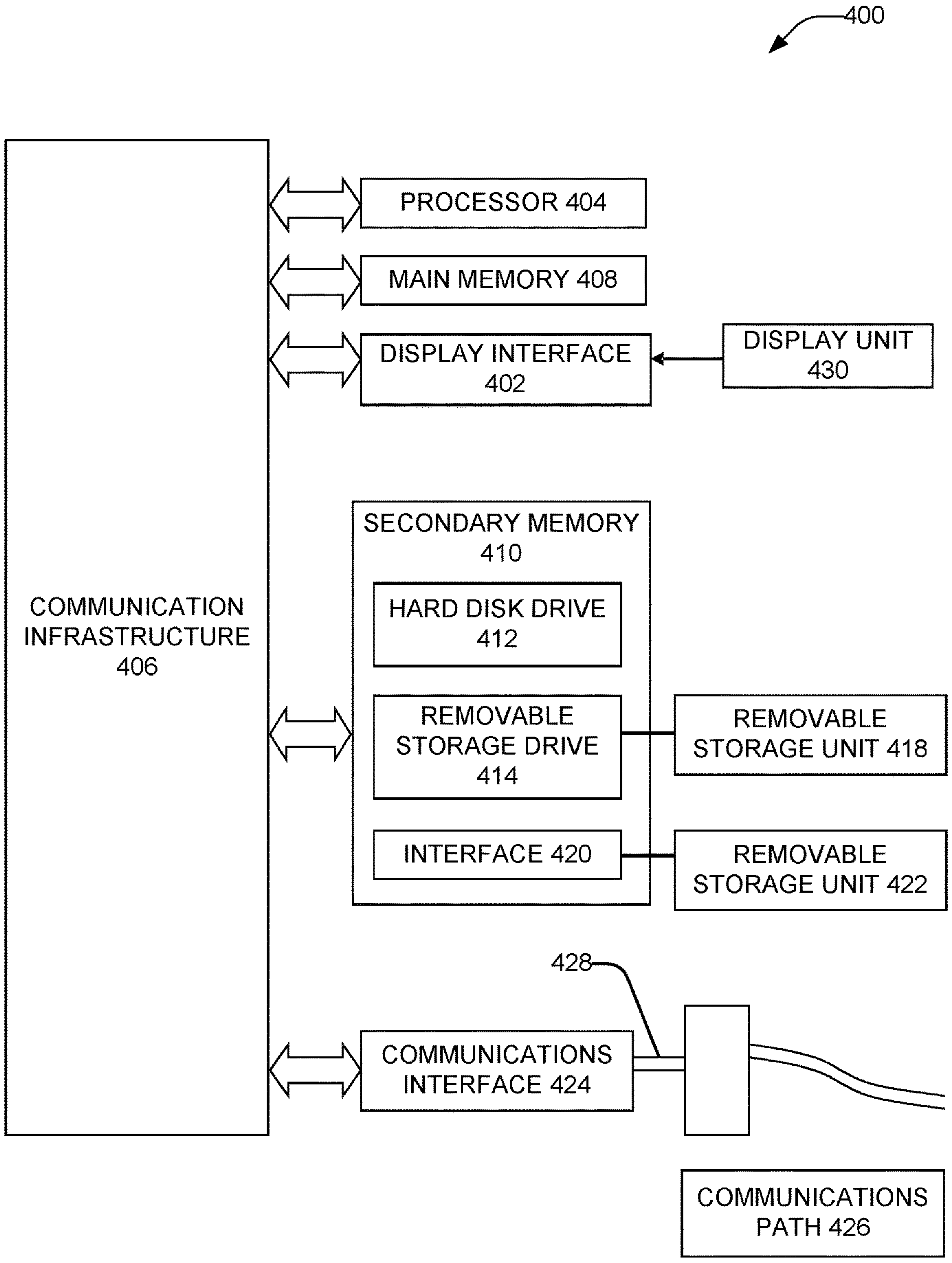
FIG. 4 is a block diagram of the example elevator control system of FIG. 1 including various hardware components and other features, according to aspects of the present disclosure.

Referring to FIG. 4, an example system 400 is presented with a diagram of various hardware components and other features, for use in accordance with an aspect of the present disclosure. Aspects of the present disclosure may be implemented using hardware, software, or a combination thereof and may be implemented in one or more computer systems or other processing systems. In one example variation, aspects described herein may be directed toward one or more computer systems capable of carrying out the functionality described herein. An example of such a computer system 400 is shown in FIG. 4. In an aspect, the elevator control system 100 of FIG. 1 may be implemented using the computer system 400.

The computer system 400 may include one or more processors, such as processor 404.

The elevator controller 102 of FIG. 1 may be an example of the processor 404. The processor 404 may be connected to a communication infrastructure 406 (e.g., a communications bus, cross-over bar, or network). Various software aspects are described in terms of this example computer system 400. After reading this description, it will become apparent to a person skilled in the relevant art(s) how to implement aspects described herein using other computer systems and/or architectures.

The computer system 400 may include a display interface 402 that forwards graphics, text, and other data from the communication infrastructure 406 (or from a frame buffer not shown) for display on a display unit 430. The computer system 400 may also include a main memory 408, e.g., random access memory (RAM), and may also include a secondary memory 410. The secondary memory 410 may include, e.g., a hard disk drive 412 and/or a removable storage drive 414, representing a floppy disk drive, a magnetic tape drive, an optical disk drive, etc. The removable storage drive 414 may read from and/or write to a removable storage unit 418 in a well-known manner. The removable storage unit 418, represents a floppy disk, magnetic tape, optical disk, etc., which is read by and written to the removable storage drive 414. As will be appreciated, the removable storage unit 418 may include a computer usable storage medium having stored therein computer software and/or data.

In alternative aspects, the secondary memory 410 may include other similar devices for allowing computer programs or other instructions to be loaded into the computer system 400. Such devices may include, e.g., a removable storage unit 422 and an interface 420. Examples of such may include a program cartridge and cartridge interface (such as that found in video game devices), a removable memory chip (such as an erasable programmable read only memory (EPROM), or programmable read only memory (PROM)) and associated socket, and other removable storage units 422 and interfaces 420, which allow software and data to be transferred from the removable storage unit 422 to the computer system 400.

The computer system 400 may also include a communications interface 424. The communications interface 424 may allow software and data to be transferred between the computer system 400 and external devices. Examples of the communications interface 424 may include a modem, a network interface (such as an Ethernet card), a communications port, a Personal Computer Memory Card International Association (PCMCIA) slot and card, etc. Software and data transferred via communications interface 424 are in the form of signals 428, which may be electronic, electromagnetic, optical, wireless, or other signals capable of being received by the communications interface 424. These signals 428 are provided to the communications interface 424 via a communications path (e.g., channel) 426. The communications path 426 may carry signals 428 and may be implemented using wire or cable, fiber optics, a telephone line, a cellular link, a radio frequency (RF) link and/or other communications channels. The terms "computer program medium," "computer usable medium," "computer readable medium," or "non-transitory computer readable medium" may be used to refer generally to media such as a removable storage drive, a hard disk installed in a hard disk drive, and/or signals 428. These computer program products provide software to the computer system 400. Aspects described herein may be directed to such computer program products.

Computer programs (also referred to as computer control logic or applications may be stored in the main memory 408 and/or the secondary memory 410. The computer programs may also be received via the communications interface 424. Such computer programs, when executed, enable the computer system 400 to perform various features in accordance with aspects described herein. In particular, the computer programs, when executed, enable the processor 404 to perform such features. Accordingly, such computer programs represent controllers of the computer system 400. The computer programs may include instructions or code for executing methods described herein.

In variations where aspects described herein are implemented using software, the software may be stored in a computer program product and loaded into the computer system 400 using the removable storage drive 414, the hard disk drive 412, or the interface 420. The control logic (software), when executed by the processor 404, causes the processor 404 to perform the functions in accordance with aspects described herein. In another variation, aspects are implemented primarily in hardware using, e.g., hardware components, such as application specific integrated circuits (ASICs). Implementation of the hardware state machine so as to perform the functions described herein will be apparent to persons skilled in the relevant art(s).

In yet another example variation, aspects described herein are implemented using a combination of both hardware and software.

Figure 5:
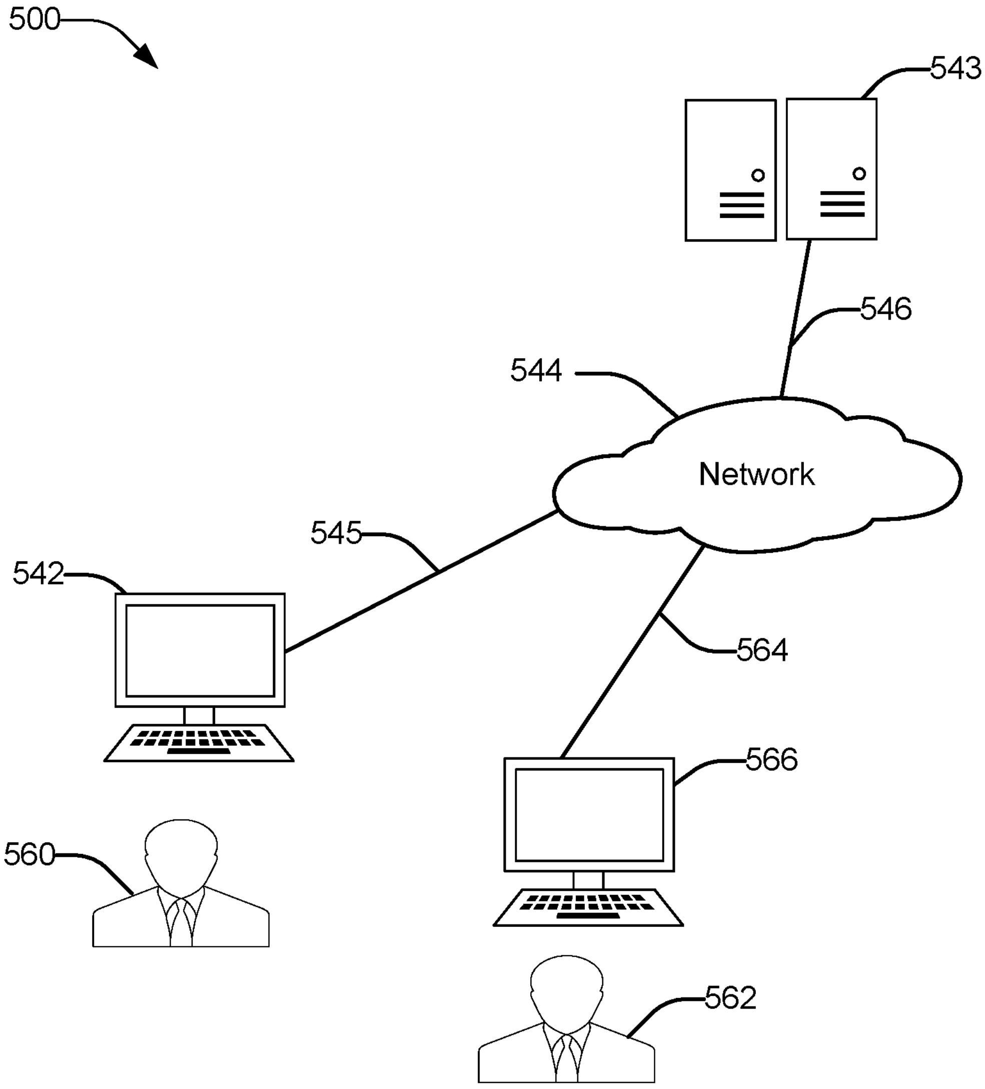
FIG. 5 is a block diagram of various example system components of the elevator control system of FIG. 1, according to aspects of the present disclosure.

FIG. 5 is a block diagram of various example system components. FIG. 5 shows a communication system 500 including one or more users 560, 562 and one or more terminals 542, 566. The terminals 542, 566 may include the elevator control system 100 of FIG. 1 or the computer system 400 of FIG. 4 or a related system or subsystem, and/or the like. In one aspect, data for use in accordance with aspects described herein may be input and/or accessed by the users 560, 562 via the terminals 542, 566, such as personal computers (PCs), minicomputers, mainframe computers, microcomputers, telephonic devices, or wireless devices, such as personal digital assistants ("PDAs") or a hand-held wireless devices coupled to a server 543, such as a PC, minicomputer, mainframe computer, microcomputer, or other device having a processor and a repository for data and/or connection to a repository for data, via, a network 544 for instance, such as the Internet or an intranet, and couplings 545, 546, 564. The couplings 545, 546, 564 may include wired, wireless, or fiber optic links. In another example variation, the method and system in accordance with aspects described herein operate in a stand-alone environment, such as on a single terminal.

ADDITIONAL EMBODIMENTS

An example elevator control system, comprising: a memory storing instructions; and one or more processors coupled with the memory and configured to: receive, from an autonomous mobile machine, a restricted floor request signal requesting access by the autonomous mobile machine to a restricted floor of a facility; determine a presence of an individual in an elevator with the autonomous mobile machine, in response to the restricted floor request signal being received; perform a tailgate prevention operation to prevent an unauthorized access of the individual to the restricted floor by following the autonomous mobile machine, in response to the presence of the individual being determined; and provide access for the autonomous mobile machine to exit the elevator at the restricted floor, in response to the tailgate prevention operation being performed.

The above-example elevator control system, wherein the one or more processors is further configured to: receive, from an elevator control panel, a floor designation indicating a designation by the individual to exit the elevator at a second floor of the facility, wherein the second floor is different from the restricted floor; and control the elevator and an elevator door during the tailgate prevention operation to provide the access for the individual to exit the elevator at the second floor, wherein the access for the autonomous mobile machine to exit the elevator at the restricted floor is provided subsequent to the elevator and the elevator door being controlled to provide access for the individual to exit the elevator at the second floor.

One or more of the above-example elevator control systems, wherein the one or more processors is further configured to: receive, from the autonomous mobile machine, an absence signal indicating an absence of the individual in the elevator, the absence signal being received subsequent to the elevator being controlled to provide access for the individual to exit the elevator at the second floor; and control the elevator and the elevator door during the tailgate prevention operation to provide access for the autonomous mobile machine to exit the elevator at the restricted floor, in response to the absence signal being received.

One or more of the above-example elevator control systems, wherein during the tailgate prevention operation the one or more processors is further configured to: transmit an interrogation signal to obtain authentication information indicating an authorization of the individual to access the restricted floor; and receive, from an access key, a data signal including the authentication information, wherein the access for the autonomous mobile machine to exit the elevator at the restricted floor is provided in response to the data signal being received.

One or more of the above-example elevator control systems, wherein during the tailgate prevention operation the one or more processors is further configured to: transmit, to a security monitor, a notification of the presence of the individual; and receive, from the security monitor, an override signal to authorize the autonomous mobile machine to exit the elevator at the restricted floor in the presence of the individual, wherein the access for the autonomous mobile machine to exit the elevator at the restricted floor is provided in response to the override signal being received.

One or more of the above-example elevator control systems, wherein the one or more processors is further configured to: receive, from the autonomous mobile machine, a presence signal indicating the presence of the individual in the elevator, wherein the presence of the individual is determined based on the presence signal.

One or more of the above-example elevator control systems, further comprising: an input device mounted in the elevator and configured to determine the presence of the individual in the elevator, wherein the presence of the individual is determined based on data from the input device.

An example method for an elevator control system to protect autonomous mobile machine tailgating, comprising: receiving, from an autonomous mobile machine, a restricted floor request signal requesting access by the autonomous mobile machine to a restricted floor of a facility; determining a presence of an individual in an elevator with the autonomous mobile machine, in response to the restricted floor request signal being received; performing a tailgate prevention operation to prevent an unauthorized access of the individual to the restricted floor by following the autonomous mobile machine, in response to the presence of the individual being determined; and providing access for the autonomous mobile machine to exit the elevator at the restricted floor, in response to the tailgate prevention operation being performed.

The above-example method, further comprising: receiving, from an elevator control panel, a floor designation indicating a designation by the individual to exit the elevator at a second floor of the facility, wherein the second floor is different from the restricted floor; and controlling the elevator and an elevator door during the tailgate prevention operation to provide the access for the individual to exit the elevator at the second floor, wherein the access for the autonomous mobile machine to exit the elevator at the restricted floor is provided subsequent to the elevator and the elevator door being controlled to provide access for the individual to exit the elevator at the second floor.

One or more of the above-example methods, further comprising: receiving, from the autonomous mobile machine, an absence signal indicating an absence of the individual in the elevator, the absence signal being received subsequent to the elevator being controlled to provide access for the individual to exit the elevator at the second floor; and controlling the elevator and the elevator door during the tailgate prevention operation to provide access for the autonomous mobile machine to exit the elevator at the restricted floor, in response to the absence signal being received.

One or more of the above-example methods, further comprising: transmitting an interrogation signal to obtain authentication information indicating an authorization of the individual to access the restricted floor; and receiving, from an access key, a data signal including the authentication information, wherein the access for the autonomous mobile machine to exit the elevator at the restricted floor is provided in response to the data signal being received.

One or more of the above-example methods, further comprising: transmitting, to a security monitor, a notification of the presence of the individual; and receiving, from the security monitor, an override signal to authorize the autonomous mobile machine to exit the elevator at the restricted floor in the presence of the individual, wherein the access for the autonomous mobile machine to exit the elevator at the restricted floor is provided in response to the override signal being received.

One or more of the above-example methods, further comprising: receiving, from the autonomous mobile machine, a presence signal indicating the presence of the individual in the elevator, wherein the presence of the individual is determined based on the presence signal.

One or more of the above-example methods, further comprising: determining the presence of the individual in the elevator based on data from an input device of the elevator control system mounted in the elevator.

An example computer-readable medium storing computer-executable code for an elevator control system to protect autonomous mobile machine tailgating, the computer-readable medium comprising code to: receive, from an autonomous mobile machine, a restricted floor request signal requesting access by the autonomous mobile machine to a restricted floor of a facility; determine a presence of an individual in an elevator with the autonomous mobile machine, in response to the restricted floor request signal being received; perform a tailgate prevention operation to prevent an unauthorized access of the individual to the restricted floor by following the autonomous mobile machine, in response to the presence of the individual being determined; and provide access for the autonomous mobile machine to exit the elevator at the restricted floor, in response to the tailgate prevention operation being performed.

The above-example computer-readable medium of claim 15, further comprising code to: receive, from an elevator control panel, a floor designation indicating a designation by the individual to exit the elevator at a second floor of the facility, wherein the second floor is different from the restricted floor; and control the elevator and an elevator door during the tailgate prevention operation to provide the access for the individual to exit the elevator at the second floor, wherein the access for the autonomous mobile machine to exit the elevator at the restricted floor is provided subsequent to the elevator and the elevator door being controlled to provide access for the individual to exit the elevator at the second floor.

One or more of the above-example computer-readable mediums, further comprising code to: receive, from the autonomous mobile machine, an absence signal indicating an absence of the individual in the elevator, the absence signal being received subsequent to the elevator being controlled to provide access for the individual to exit the elevator at the second floor; and control the elevator and the elevator door during the tailgate prevention operation to provide access for the autonomous mobile machine to exit the elevator at the restricted floor, in response to the absence signal being received.

One or more of the above-example computer-readable mediums, further comprising code to: transmit an interrogation signal to obtain authentication information indicating an authorization of the individual to access the restricted floor; and receive, from an access key, a data signal including the authentication information, wherein the access for the autonomous mobile machine to exit the elevator at the restricted floor is provided in response to the data signal being received.

One or more of the above-example computer-readable mediums, further comprising code to: transmit, to a security monitor, a notification of the presence of the individual; and receive, from the security monitor, an override signal to authorize the autonomous mobile machine to exit the elevator at the restricted floor in the presence of the individual, wherein the access for the autonomous mobile machine to exit the elevator at the restricted floor is provided in response to the override signal being received.

One or more of the above-example computer-readable mediums, further comprising code to: receive, from the autonomous mobile machine, a presence signal indicating the presence of the individual in the elevator, wherein the presence of the individual is determined based on the presence signal.

One or more of the above-example computer-readable mediums, further comprising code to: determine the presence of the individual in the elevator based on data from an input device of the elevator control system mounted in the elevator.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean “one and only one” unless specifically so stated, but rather “one or more.” The word “exemplary” is used herein to mean “serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An elevator control system, comprising:

a memory storing instructions; and one or more processors coupled with the memory and configured to:

receive, from an autonomous mobile machine, a restricted floor request signal requesting access by the autonomous mobile machine to a restricted floor of a facility;

receive, from the autonomous mobile machine, a presence signal indicating a presence of an individual in an elevator;

in response to the restricted floor request signal being received, determine the presence of the individual in the elevator with the autonomous mobile machine based on the presence signal received from the autonomous mobile machine;

perform a tailgate prevention operation to prevent an unauthorized access of the individual to the restricted floor by following the autonomous mobile machine, in response to the presence of the individual being determined; and provide access for the autonomous mobile machine to exit the elevator at the restricted floor, in response to the tailgate prevention operation being performed.

2. The elevator control system of claim 1, wherein the one or more processors is further configured to:

receive, from an elevator control panel, a floor designation indicating a designation by the individual to exit the elevator at a second floor of the facility, wherein the second floor is different from the restricted floor; and control the elevator and an elevator door during the tailgate prevention operation to provide the access for the individual to exit the elevator at the second floor, wherein the access for the autonomous mobile machine to exit the elevator at the restricted floor is provided subsequent to the elevator and the elevator door being controlled to provide access for the individual to exit the elevator at the second floor.

3. The elevator control system of claim 2, wherein the one or more processors is further configured to:

receive, from the autonomous mobile machine, an absence signal indicating an absence of the individual in the elevator, the absence signal being received subsequent to the elevator being controlled to provide access for the individual to exit the elevator at the second floor; and control the elevator and the elevator door during the tailgate prevention operation to provide access for the autonomous mobile machine to exit the elevator at the restricted floor, in response to the absence signal being received.

4. The elevator control system of claim 1, wherein during the tailgate prevention operation the one or more processors is further configured to:

transmit an interrogation signal to obtain authentication information indicating an authorization of the individual to access the restricted floor; and receive, from an access key, a data signal including the authentication information, wherein the access for the autonomous mobile machine to exit the elevator at the restricted floor is provided in response to the data signal being received.

5. The elevator control system of claim 1, wherein during the tailgate prevention operation the one or more processors is further configured to:

transmit, to a security monitor, a notification of the presence of the individual; and receive, from the security monitor, an override signal to authorize the autonomous mobile machine to exit the elevator at the restricted floor in the presence of the individual, wherein the access for the autonomous mobile machine to exit the elevator at the restricted floor is provided in response to the override signal being received.

6. The elevator control system of claim 1, further comprising:

an input device mounted in the elevator and configured to determine the presence of the individual in the elevator, wherein the presence of the individual is determined based on data from the input device.

7. The elevator control system of claim 1, wherein the one or more processors is further configured to:

receive, from the autonomous mobile machine, an absence signal indicating an absence of the individual in the elevator, the absence signal being received subsequent to the elevator being controlled to provide access for the individual to exit the elevator at a non-restricted floor.

8. A method for an elevator control system to protect autonomous mobile machine tailgating, comprising:

receiving, from an autonomous mobile machine, a restricted floor request signal requesting access by the autonomous mobile machine to a restricted floor of a facility;

receiving, from the autonomous mobile machine, a presence signal indicating a presence of an individual in an elevator;

in response to the restricted floor request signal being received, determining the presence of the individual in the elevator with the autonomous mobile machine based on the presence signal received from the autonomous mobile machine;

performing a tailgate prevention operation to prevent an unauthorized access of the individual to the restricted floor by following the autonomous mobile machine, in response to the presence of the individual being determined; and providing access for the autonomous mobile machine to exit the elevator at the restricted floor, in response to the tailgate prevention operation being performed.

9. The method of claim 8, further comprising:

receiving, from an elevator control panel, a floor designation indicating a designation by the individual to exit the elevator at a second floor of the facility, wherein the second floor is different from the restricted floor; and controlling the elevator and an elevator door during the tailgate prevention operation to provide the access for the individual to exit the elevator at the second floor, wherein the access for the autonomous mobile machine to exit the elevator at the restricted floor is provided subsequent to the elevator and the elevator door being controlled to provide access for the individual to exit the elevator at the second floor.

10. The method of claim 9, further comprising:

receiving, from the autonomous mobile machine, an absence signal indicating an absence of the individual in the elevator, the absence signal being received subsequent to the elevator being controlled to provide access for the individual to exit the elevator at the second floor; and controlling the elevator and the elevator door during the tailgate prevention operation to provide access for the autonomous mobile machine to exit the elevator at the restricted floor, in response to the absence signal being received.

11. The method of claim 8, further comprising:

transmitting an interrogation signal to obtain authentication information indicating an authorization of the individual to access the restricted floor; and receiving, from an access key, a data signal including the authentication information, wherein the access for the autonomous mobile machine to exit the elevator at the restricted floor is provided in response to the data signal being received.

12. The method of claim 8, further comprising:

transmitting, to a security monitor, a notification of the presence of the individual; and receiving, from the security monitor, an override signal to authorize the autonomous mobile machine to exit the elevator at the restricted floor in the presence of the individual, wherein the access for the autonomous mobile machine to exit the elevator at the restricted floor is provided in response to the override signal being received.

13. The method of claim 8, further comprising:

determining the presence of the individual in the elevator based on data from an input device of the elevator control system mounted in the elevator.

14. A non-transitory computer-readable medium storing computer-executable code for an elevator control system to protect autonomous mobile machine tailgating, the non-transitory computer-readable medium comprising code that when executed by one or more processors performs a method to:

receive, from an autonomous mobile machine, a restricted floor request signal requesting access by the autonomous mobile machine to a restricted floor of a facility;

receive, from the autonomous mobile machine, a presence signal indicating a presence of an individual in an elevator;

in response to the restricted floor request signal being received, determine the presence of the individual in the elevator with the autonomous mobile machine based on the presence signal received from the autonomous mobile machine;

perform a tailgate prevention operation to prevent an unauthorized access of the individual to the restricted floor by following the autonomous mobile machine, in response to the presence of the individual being determined; and provide access for the autonomous mobile machine to exit the elevator at the restricted floor, in response to the tailgate prevention operation being performed.

15. The non-transitory computer-readable medium of claim 14, further comprising code to:

receive, from an elevator control panel, a floor designation indicating a designation by the individual to exit the elevator at a second floor of the facility, wherein the second floor is different from the restricted floor; and control the elevator and an elevator door during the tailgate prevention operation to provide the access for the individual to exit the elevator at the second floor, wherein the access for the autonomous mobile machine to exit the elevator at the restricted floor is provided subsequent to the elevator and the elevator door being controlled to provide access for the individual to exit the elevator at the second floor.

16. The non-transitory computer-readable medium of claim 15, further comprising code to:

receive, from the autonomous mobile machine, an absence signal indicating an absence of the individual in the elevator, the absence signal being received subsequent to the elevator being controlled to provide access for the individual to exit the elevator at the second floor; and control the elevator and the elevator door during the tailgate prevention operation to provide access for the autonomous mobile machine to exit the elevator at the restricted floor, in response to the absence signal being received.

17. The non-transitory computer-readable medium of claim 14, further comprising code to:

transmit an interrogation signal to obtain authentication information indicating an authorization of the individual to access the restricted floor; and receive, from an access key, a data signal including the authentication information, wherein the access for the autonomous mobile machine to exit the elevator at the restricted floor is provided in response to the data signal being received.

18. The non-transitory computer-readable medium of claim 14, further comprising code to:

transmit, to a security monitor, a notification of the presence of the individual; and receive, from the security monitor, an override signal to authorize the autonomous mobile machine to exit the elevator at the restricted floor in the presence of the individual, wherein the access for the autonomous mobile machine to exit the elevator at the restricted floor is provided in response to the override signal being received.

* * * * *